(12) United States Patent
Klompje et al.

(10) Patent No.: US 10,372,475 B2
(45) Date of Patent: *Aug. 6, 2019

(54) APPROACHES FOR MANAGING VIRTUAL INSTANCE DATA

(71) Applicant: Amazon Technologies, Inc., Reno, NV (US)

(72) Inventors: Gideon Klompje, Paarl (ZA); Mathew Daniel, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/236,259

(22) Filed: Aug. 12, 2016

(65) Prior Publication Data

US 2017/0220370 A1 Aug. 3, 2017

Related U.S. Application Data

(63) Continuation of application No. 14/562,327, filed on Dec. 5, 2014, now Pat. No. 9,417,897.

(51) Int. Cl.
*G06F 8/61* (2018.01)
*G06F 9/455* (2018.01)

(52) U.S. Cl.
CPC ............ *G06F 9/45558* (2013.01); *G06F 8/61* (2013.01); *G06F 2009/4557* (2013.01); *G06F 2009/45562* (2013.01); *G06F 2009/45595* (2013.01)

(58) Field of Classification Search
CPC .................................................. G06F 9/45558
USPC .................................................. 718/101–108
See application file for complete search history.

(56) References Cited

U.S. PATENT DOCUMENTS 6,957,206 B2 10/2005 Nolan
7,082,521 B1 7/2006 Nanja
(Continued)

OTHER PUBLICATIONS

Krsul, Ivan, et al. "Vmplants: Providing and managing virtual machine execution environments for grid computing." Proceedings of the 2004 ACM/IEEE conference on Supercomputing. IEEE Computer Society, 2004.pp. 1-12.*

(Continued)

*Primary Examiner* — Satish Rampuria
(74) *Attorney, Agent, or Firm* — Hogan Lovells US LLP

(57) ABSTRACT

A resource provider is able to manage instance data associated with virtual compute instances running in the resource provider environment. For example, when provisioning a compute instance, the resource provider can obtain data associated with the compute instance and can store this data, for example, in a data store. The resource provider can act as a centralized repository of such data for some or all instances that are running in the resource provider environment. Entities (e.g., users or other compute instances running in the resource provider environment) can query the resource provider to perform various operations (e.g., read, modify, duplicate) on the data being managed by the resource provider for the various compute instances. Any changes to the data for a compute instance, for example, by a user, the compute instance, or a different compute instance, can be saved by the resource provider and propagated to the compute instance.

12 Claims, 9 Drawing Sheets

(56) References Cited

U.S. PATENT DOCUMENTS

| | | | |
|---|---|---|---|
| 8,413,146 B1 | 4/2013 | McCorkendale | |
| 8,954,574 B1* | 2/2015 | Chheda | G06Q 20/085 709/220 |
| 9,183,028 B1 | 11/2015 | Brandwine | |
| 9,213,503 B2 | 12/2015 | B | |
| 2009/0288084 A1* | 11/2009 | Astete | G06F 9/45533 718/1 |
| 2011/0004676 A1 | 1/2011 | Kawato | |
| 2012/0011284 A1* | 1/2012 | Filali-Adib | G06F 9/5016 710/8 |
| 2012/0131574 A1 | 5/2012 | Day, II | |
| 2012/0167077 A1 | 6/2012 | Arscott | |
| 2014/0006617 A1* | 1/2014 | Lakshman | H04L 63/102 709/225 |
| 2014/0025770 A1* | 1/2014 | Warfield | G06F 15/17331 709/213 |
| 2017/0180346 A1* | 6/2017 | Suarez | G06F 9/45558 |

OTHER PUBLICATIONS

Hertel, Guido, Susanne Geister, and Udo Konradt. "Managing virtual teams: A review of current empirical research." Human resource management review 15.1 (2005): pp. 69-95.*

Beloglazov, Anton, and Rajkumar Buyya. "Managing overloaded hosts for dynamic consolidation of virtual machines in cloud data centers under quality of service constraints." IEEE Transactions on Parallel and Distributed Systems 24.7 (2013): pp. 1366-1379.*

Nurmi, Daniel, et al. "The eucalyptus open-source cloud-computing system." Cluster Computing and the Grid, 2009. CCGRID'09. 9th IEEE/ACM International Symposium on. IEEE, 2009.pp. 124-131.*

"Non Final Office Action dated Nov. 25, 2015" received in U.S. Appl. No. 14/562,327.

"Notice of Allowance dated Apr. 25, 2016" received in U.S. Appl. No. 14/562,327.

Cerbelaud, Damien, Shishir Garg, and Jeremy Huylebroeck. "Opening the clouds: qualitative overview of the state-of-the-art open source VM-based cloud management platforms." Proceedings of the 10$^{th}$ ACM/IFIP/USENIX International Conference on Middleware, Springer-Verlag New York, Inc., 2009, pp. 1-8.

Yskout, Koen, Riccardo Scandariato, and Wouter Joosen. "Change patterns." Software & Systems Modeling 13.2 (2014): pp. 625-648.

Dima, Emanuel, et al. "A Metadata Editor to Support the Description of Linguistic Resources." LREC. 2012, pp. 1061-1066.

* cited by examiner

US 10,372,475 B2

APPROACHES FOR MANAGING VIRTUAL INSTANCE DATA

CROSS-REFERENCE TO RELATED APPLICATION

This application is a continuation of allowed U.S. application Ser. No. 14/562,327 entitled "APPROACHES FOR MANAGING VIRTUAL INSTANCE DATA," filed Dec. 5, 2014, which is incorporated herein by reference for all purposes.

BACKGROUND

As an increasing number of applications and services are being made available over networks, such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Instead, the hardware and/or software needed to provide access to such resources is maintained by a resource provider. Many resource providers utilize virtualization and multitenant architectures to allow multiple users to share the underlying hardware and/or software resources. Virtualization can allow computing servers, storage device or other resources to be partitioned into multiple isolated instances that are associated with (e.g. owned by) a particular user. This can enable various users to run their applications remotely, using on the resources of the resource provider. Each instance can be associated information (e.g., metadata) that can describe, for example, attributes of the instance. An instance may need to reference such information for performing various actions during its lifecycle.

BRIEF DESCRIPTION OF THE DRAWINGS

Various embodiments in accordance with the present disclosure will be described with reference to the drawings, in which.

DETAILED DESCRIPTION

Figure 1:
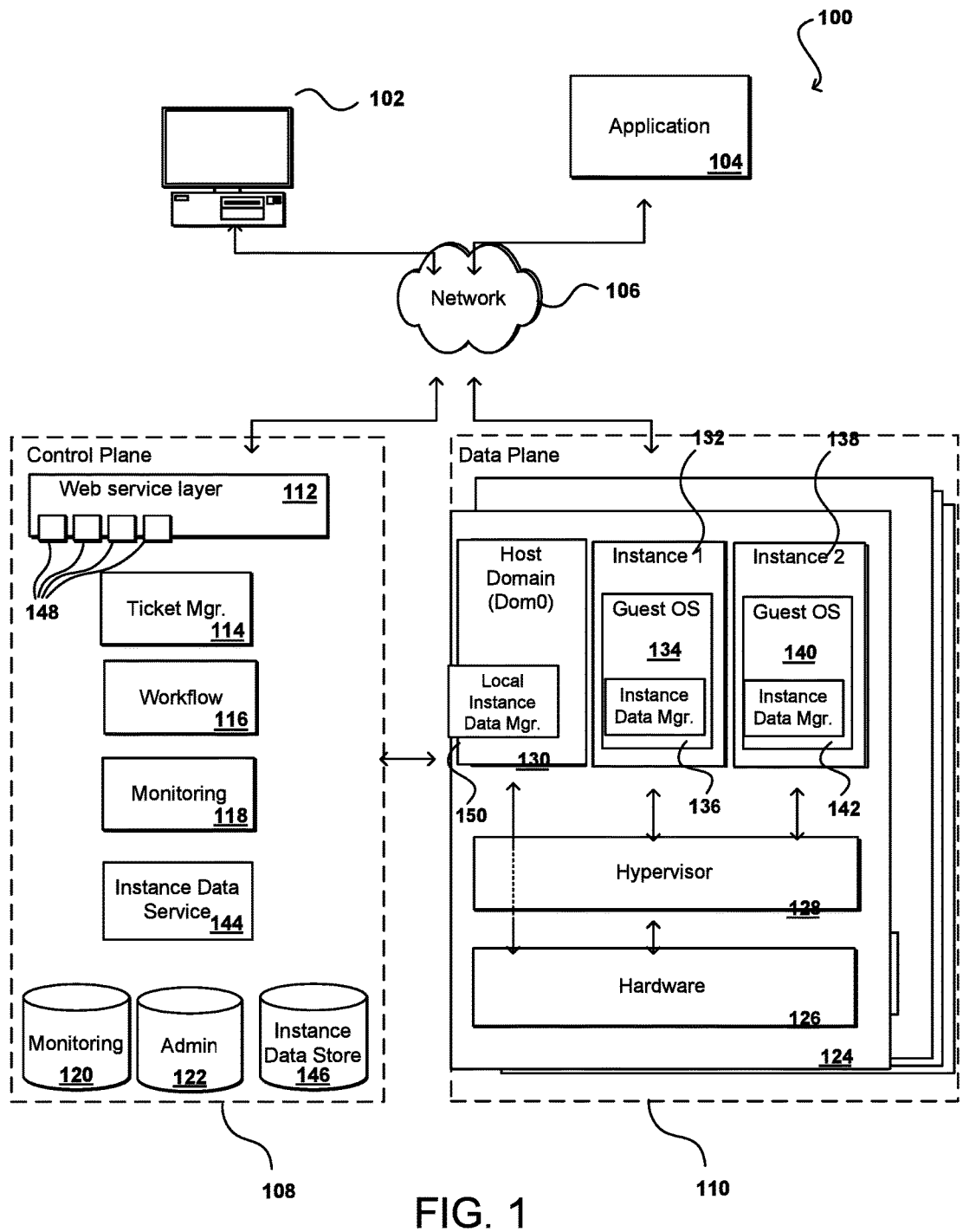
FIG. 1 illustrates an environment in which various embodiments can be implemented.

Systems and methods in accordance with various embodiments of the present disclosure may overcome one or more of the aforementioned and other deficiencies experienced in conventional approaches to managing resources in an electronic provider environment.

A resource provider might provide a set of virtual instances (e.g., resources) of one or more types that are able to be utilized by multiple clients, such as may be part of a multi-tenant, shared resource, or "cloud" offering. Such instances can each be associated with various instance data (e.g., metadata and/or data provided by users or customers) that can be used to configure and/or manage the instance. Such data may be determined based, in part, on various configuration parameters describing the instance. For example, instance data can describe various attributes of the instance (e.g., the number of virtual central processing units (CPUs) available in the instance, memory, storage capacity, etc.). Instance data may also describe various attributes or information provided by a customer for customizing or managing the instance. Such instance data may include, for example, custom parameters or system environment variables, scripts or programs, temporary credentials used to make requests to services operated by the resource provider, an identifier for the instance within the resource provider environment, security groups the instance belongs to, and/or various cryptographic keys (e.g., public/private keys) that the instance can access and utilize when running. One example of a custom parameter includes flags or parameters for customizing an instance or software (e.g., database or webserver) running on the instance.

In conventional environments, each host server is tasked with the responsibility of storing and managing instance data for the instances that it runs and making the data available to the instances For example, an instance can query the host for information (e.g., value of an attribute-value pair) corresponding to any instance data attributes when such information is needed. Such conventional approaches can have drawbacks that limit the potential of how instance data can be used to configure and manage instances. For example, under the conventional approach, instance data for an instance typically remains stored on the host on which the instance is running. Instance data for the instance is usually created when the instance is provisioned and can be maintained for the lifetime of the instance until the instance is unprovisioned (e.g., shut down).

Having host servers manage their own instance data is undesirable for a number of reasons. For example, since instance data for an instance typically remains stored on the host on which the instance is running, this instance data is not able to be shared with other instances running on other hosts. This can limit customers from configuring instances to interact with one another using shared instance data. Further, having hosts manage instance data can increase the computational burden on the host (e.g., Dom0 resources are used to process and retrieve instance data in response to requests). Additionally, any updates to the instance data for an instance would need to be made by the instance that is managing the instance data. However, as mentioned, such limitations can negatively impact the customer experience, since some customers may want to be able to update or change instance data for any given instance through a single interface.

Accordingly, approaches in accordance with various embodiments utilize an instance data service for managing instance data associated with instances. For example, when provisioning a compute instance, the instance data service can obtain instance data associated with the compute instance and can store this instance data, for example, in an instance data store. The instance data service can act as a centralized repository of instance data for some or all instances that are running in the resource provider environment. Entities can query the instance data service to perform various operations (e.g., read, modify, duplicate) on the instance data being managed by the instance data service for the various instances.

Various other applications, processes and uses are presented below with respect to the various embodiments.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, virtual machine instances, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces (e.g., graphical user interfaces and/or command-line operations) are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task, e.g., to launch a virtual machine instance (e.g., instance 132 or 138) on a server (e.g., host computing device 124) of the data plane 110. The user or an application 104 can access the instance for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 108 in this example is essentially a virtual layer of hardware and software components that handles control and management actions, e.g., launching, stopping, terminating instances, etc. The control plane in this embodiment includes a Web services layer 112, or tier, which can include at least one Web server, for example, along with computer-executable software, application servers, or other such components. The Web services layer also can include a set of APIs 148 (or other such interfaces) for receiving Web service calls or requests through the network 106. Each API can be provided to receive requests for at least one specific action to be performed with respect to the data environment, e.g., to provision, scale, clone, or hibernate an instance. Upon receiving a request to one of the APIs 148, the Web services layer can parse or otherwise analyze the request to determine the steps or actions that are needed to act on or process the call. For example, a Web service call might be received that includes a request to launch a virtual machine 132. In this example, the Web services layer can parse the request to determine the a machine image to use to launch the virtual machine 132, a size or type of virtual machine to launch, whether to provision the virtual machine instance with temporary credentials to make web service calls to other services operated by the resource provider, or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features, e.g., authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "ticket manager" component 114. A ticket manager component can be any appropriate component operable to determine any tasks to be executed in response to an outstanding request. In this example, the Web services layer might place instructions or information for a request in a job queue, and the ticket manager can identify the outstanding request and determine any tasks corresponding to the request. Various other approaches can be used as would be apparent to one of ordinary skill in the art, such as the Web services layer sending a notification to a ticket manager that a job exists. The ticket manager component can identify the request, and using information for the request can send a request, call, or other such command to a workflow component 116 operable to instantiate at least one workflow for the request. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component 116 (or system of components) in one embodiment is operable to manage and/or perform the hosting and executing of workflows for tasks, including, for example: instance launch and termination; recovery and backup; security group creation, deletion, and modification; user credentials management; and key rotation and credential management. Such workflows can be implemented on top of a workflow service, as discussed elsewhere herein.

An example workflow for a customer might include tasks, e.g., provisioning a virtual machine instance, allocating a volume of off-instance persistent storage, attaching the persistent storage volume to the virtual machine instance, then allocating and attaching a IP address or other address, port, interface, or identifier which the customer can use to access or otherwise connect to the instance. In this example, a user is provided with the IP address to be used to access the instance. The workflow also can include tasks to download and install any binaries or other information. The workflow component can manage the execution of these and any related tasks, or any other appropriate combination of such tasks, and can generate a response to the request indicating the creation of an "instance" in response to the "create instance" request. A user then can access the instance directly using the IP address and port, without having to access or go through the control plane 108.

As mentioned, various embodiments can take advantage of a workflow service that can receive requests or calls for a current state of a process or task, such as the provisioning of a virtual machine instance, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) to host machines to perform the task. Workflows and tasks can be scheduled in parallel in order to increase throughput and maximize processing resources. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When an instance is created in the data plane, information for the instance can be written to a data store in the control plane, e.g., a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, e.g., collecting log and/or event information from multiple components of the control plane and/or data plane, e.g., the Web service layer 112, workflow component 116, ticket manager component 114, and various host managers. Using such event information, the monitoring component can expose customer-visible events, for various purposes, including, for example, implementing customer-facing APIs. A monitoring component can constantly monitor the health of instances for the control plane, detect the failure of any of these instances, and initiate the appropriate recovery process(es).

In the example of FIG. 1, a server 124 is hosting a first virtual machine instance 132 and a second virtual machine instance 138 that were launched, for example, using the approaches described above. The server 124 includes hardware 126 that interfaces with a hypervisor 128 running directly on the hardware 126 (e.g., a "bare metal" or native hypervisor). Examples of such hypervisors include Xen, Hyper-V®, and the like. Hypervisors typically run at a higher, more privileged processor state than any other software on the machine, and may provide services such as memory management and processor scheduling for dependent layers and/or domains. The most privileged of such layers and/or domains resides in the service domain layer, which may include a host domain 130 (e.g., Dom0) that may include an administrative operating system for configuring the operation and functionality of the hypervisor 128, as well as that of domains of lower privilege, such as the domains of the guest virtual machines (132, 138) or other operating systems, which may be heterogeneous (e.g., running different operating systems than each other). The host domain 130 (e.g., Dom0) may have direct access to the hardware resources 126 of the server 124 by way of the hypervisor 128, while the guest virtual machine domains (132, 138) may not. Each of the virtual machine instances (132, 138) may be assigned to (e.g., "owned by") at least one user. The virtual machine instances on a single server (or host computing device) may all be owned by one user or may be owned by several users.

Each instance can include a guest operating system that runs on the instance. In the example of FIG. 1, a guest operating system 134 is shown as running on the instance 132 and a guest operating system 140 is shown as running on the instance 138. In various embodiments, an instance data manager can run in such a guest operating system. For example, in FIG. 1, a first instance data manager 136 is shown as running in the guest operating system 134 and a second instance data manager 142 is shown as running in the guest operating system 140. Each instance data manager can be configured to interact with the instance data service 144 that runs in the control plane 108 and the local instance data service 150 that runs in the Dom0 (or hypervisor) 130, as described below. For example, the instance data manager can query the instance data service 144 for various instance data (e.g., metadata) and store the instance data obtained from the instance data service 144 in memory of the guest operating system. In some embodiments, the instance data manager can be part of a software development kit provided by the service provider to customers.

For example, when virtual machine instances (132, 138) are provisioned, each instance can be associated with various instance data that may be used to configure or manage the instance. This instance data may be determined based, in part, on various configuration parameters describing the instance, for example, but can also include various information provided by a customer for customizing or managing the instance. Although the term "instance data" is used herein, other terms such as "configuration data" or "instance metadata" may be used interchangeably to refer to the same data.

Some example of instance data include hardware specifications of the instance (e.g., the number of virtual central processing units (CPUs), memory, storage capacity, etc.), network information associated with the instance (e.g., hostnames, Internet Protocol addresses, networking interface information, etc.), and other information corresponding to the instance including, for example, type of operating system running on the instance or instance architecture (e.g., 32- or 64-bit). Such examples generally describe attributes that can be used to configure the instance.

As mentioned, users or entities can also provide instance data for the instance that may be used to further customize the configuration or management of the instance. Such instance data may include, for example, custom parameters, scripts or programs, and/or various cryptographic keys (e.g., public/private keys) that the instance can access and utilize when running. Such information can be provided as strings of text or as files (e.g., JavaScript Object Notation (JSON) files). One example of a custom parameter includes flags or parameters for customizing an instance or software running on the instance. For example, a user may provision an instance to run a webserver. When provisioning the instance, the user may provide instance data identifying which webserver configuration file (e.g., "httpd-config=/network/storage/httpd.conf" or "httpd-config=/network/storage/httpd-test.conf") should be used by the web server. The instance can then be instructed to utilize the instance data to determine which configuration file to use for configuring its webserver.

As mentioned, in conventional environments, each host server is tasked with the responsibility of storing and managing instance data for the instances it hosts. Using the architecture of FIG. 1 as an example, such a conventional service for storing and managing instance would run in the host domain 130 (e.g., Dom0). In this conventional approach, the instance can query the host for information corresponding to any instance data entry when such information is needed. Such conventional approaches can have drawbacks that limit the potential of how instance data can be used to configure and manage instances, as described above.

Figure 2:
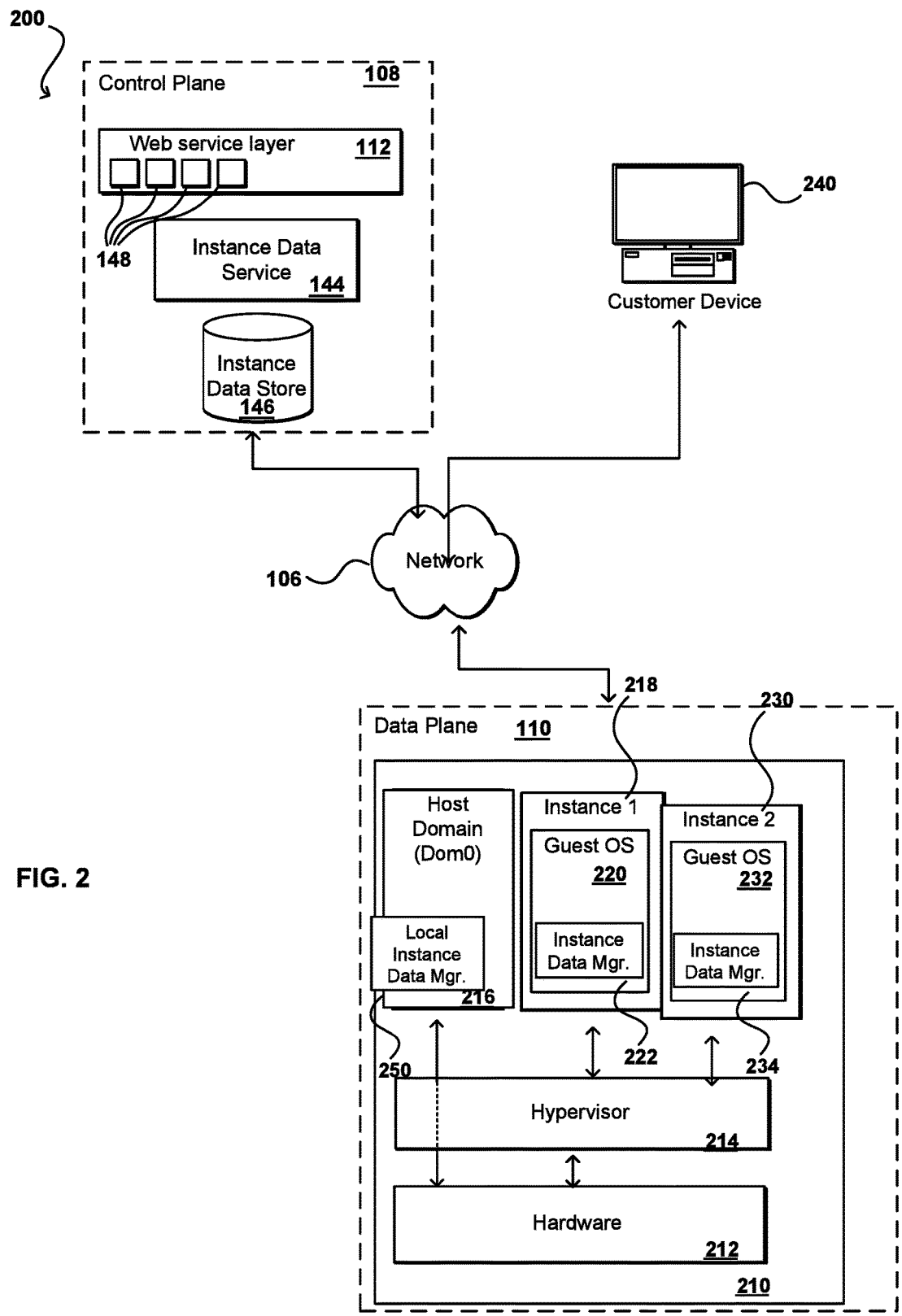
FIG. 2 illustrates an example set of components that can be utilized to implement an approach in accordance with various embodiments.

Accordingly, approaches in accordance with various embodiments utilize an instance data service 144 running in the control plane 108 for managing instance data associated with instances. For example, when provisioning a compute instance, the instance data service 144 can obtain instance data associated with the compute instance, as described above, and can store this instance data, for example, in an instance data store 146. As mentioned, this instance data can include configuration parameters provided for the instance in the provisioning request sent through the various interfaces described above (e.g., APIs 148). This instance data can also include any data (e.g., metadata) provided to further customize the configuration or management of the instance, as described above. An instance can utilize an instance data manager running on the guest operating system of the instance to access the instance data service 144 for obtaining and/or updating instance data, as illustrated in the example of FIG. 2. For example, in various embodiments, the instance data manager 136 running on the instance 132 can interact with the instance data service 144 to access and/or modify instance data for the instance 132. Similarly, the instance data manager 136 running on the instance 132 can also interact with the instance data service 144 to access and/or modify instance data for the instance 138 provided that any access rights or policies, as specified by the implementation, are satisfied.

FIG. 2 illustrates a set of example components 200 that can be utilized to implement an approach in accordance with various embodiments. The example components 200 include the control plane 108, as described in reference to FIG. 1, through which the instance data service 144 is provided. As mentioned, the instance data service 144 can be configured to store instance data for some or all instances that are running in the data plane 110. The example components 200 also include a server or host machine 210 that hosts a virtual machine (or compute) instance 218 running in the data plane 110.

As mentioned, the server 210 can include hardware 212 that interfaces with a hypervisor 214 running directly on the hardware 212 (e.g., a "bare metal" or native hypervisor). The server 210 may include a host domain 216 (e.g., Dom0) that may include an administrative operating system for configuring the operation and functionality of the hypervisor 214, as well as that of domains of lower privilege, such as the domains of the virtual machine instance 218. The instance 218 includes a guest operating system 220 that runs on the instance 218. In various embodiments, an instance data manager 222 is running in the guest operating system 220.

Reference numbers for similar elements are carried over between figures throughout this specification for ease of explanation, but it should be understood that this is merely done as a matter of convenience and not intended to be a limitation on the various embodiments.

In this example, when the instance 218 is provisioned, the instance data service 144 obtains and stores any instance data associated with the instance 218 in the instance data store 146. As described above, this instance data can include any instance data (e.g., configuration parameters) either determined by the resource provider (e.g., DNS information such as hostnames and IP addresses) or instance data provided by the customer for configuring or managing the instance 218. This instance data can be provided to the instance, so that the instance 218 can use the data or configure itself. After the instance data is provided, the instance data manager 222 can store some or all of the entries in a file, which in turn can be stored on local storage provided by the host server 210 to the instance 218.

In an example embodiment, when the instance 210 launches, the instance data manager 222 can make a web service request (e.g., a GET request) to the instance data service 144 to fetch instance metadata. In some embodiments, at least some APIs 148 in the control plane 108 are configured to allow instances to interact with the instance data service 144, for example, for the purposes of obtaining instance data or for updating instance data. In some embodiments, requests to the instance data service 144 can be made through a public application programming interface (API) though which an entity (e.g., customers, virtual machine instances, other services such as web services, etc.) with the proper authorization credentials is able to interact with the instance data service 144 to read and/or update data that is managed by the instance data service 144, in accordance with an access control policy. The web service layer of the instance data service 114 can have at least one IP address (e.g., a globally routable unicast IP address) that is generally accessible through a network (e.g., the Internet).

Depending on the implementation, requests received from customers or instances may be authenticated differently. For example, a web service request to the instance data service 144 may have to be authenticated before the instance data service 144 returns metadata. For example, a customer 240 may be required to provide their correct access credentials before any request from the customer 240 will be processed. In another example, a request from the instance 218 can include session tokens or be signed with a session token (e.g., the session token can be a cryptographic key) provided to the instance 218 upon provisioning. That is, when the instance 218 is provisioned, the session token can be sent to the instance 218 and the instance 218 can store the session token in its local memory. When the instance 218 attempts to communicate with the instance data service 144, for example, through the APIs 148, the instance 218 can use the session token to identify itself to the instance data service 144 and therefore interact with the instance data service 144. In some embodiments, the session token may be associated with an expiration time within which the instance 218 needs to identify itself to the instance data service 144 otherwise the session token becomes invalid, thereby preventing the instance 218 from authenticating itself to the instance data service 144 using the expired session token. For example, when a request is received to launch the instance 218, a workflow is initiated that includes making a call to a token service to generate a session token (e.g., temporary credential) that can be stored in a data store. Eventually, the workflow will cause a request to be sent to the host 210 to instantiate the instance 218. In an example embodiment, the temporary credential can be supplied to the host 210 in conjunction with the request to launch the instance 218. The local instance data service 250 running in, for example Dom0 216, can receive the temporary credential and store it in a table in association with an identifier for the instance 218. Once the instance 218 is running, the instance data manager 222 can make a call to the local instance data service 250. The request can be intercepted or received by the local instance data service 250 in Dom0 (e.g., the local instance data manager 250 can be listening for requests and can process the request. The local instance data service 250 can determine the virtual machine that sent the request and check the table to see if it includes a credential. Next, the local instance data service 250 can provide the temporary credential to the instance. Next, the instance data manager 222 can make a request (including the temporary credential or using the temporary credential to sign the request) to the instance data service 144. The instance data service 144 can authenticate the request and provide metadata back to the instance data manager 222.

Thus, the instance 218 can utilize the APIs 148 to obtain the instance data from the instance data service 144. The instance data service 144 can obtain the requested instance data from the instance data store 146 and can provide the instance data to the instance 218 or the local instance data service 250 (acting as a cache in this embodiment), for example, over the network 106. Once the instance data is obtained, the instance data manager 222 can store the requested instance data and send a copy to the in local instance data service 250.

In some embodiments, the local instance data service 250 can include a cache and the instance data manager 222 can be configured to send requests to the local instance data service 250, instead of sending requests to the instance data service 144. A benefit to this embodiment is that the instance data can be accessed without having to make a network request. However, in embodiments where instance data in the instance data service 144 can be modified, such instance data may become stale over time. To address such discrepancies, in some embodiments, each instance data entry in the local instance data service 250 can be associated with a value indicating an amount of time for which the instance data entry is valid or a last time the value was updated. The instance data entry can be deleted from the local instance data service 250 once the amount of time for the instance data entry expires. Thus, any future attempt to access that instance data entry from the local instance data service 250 will result in the instance data manager 222 not being able to obtain the requested instance data from the local instance data service 250 and, as a result, the instance data manager 222 will obtain the requested instance data from the instance data service 144, as described above. In another embodiment, the local instance data service 250 can refresh the cache by making requests to the instance data service 144. For example, the instance data service 144 can be configured to make periodic web service requests.

The local instance data service 250 can apply known caching approaches for maintaining data consistency between itself and instance data service 144. For example, anytime there is an update (e.g., modification) to the instance data for the instance 218, the instance data service 144 can send such updates to the instance 218 as soon as the update is performed and/or send the updates to the local instance data service 250, in embodiments where the local instance data service 250 is configured to cache data. Alternatively, the instance data manager 222 and/or the local instance data service 250 can be configured to poll the instance data service 144 using long-polling techniques or the like.

Such updates to the instance data for the instance 218 may arise from mutations in the instance 218 itself. Mutation of a particular instance can involve making a change to some aspect of the instance that corresponds to an instance data entry, including, for example, attaching/detaching a resource (e.g., a volume, an IP address, etc.), modifying an operating system, a production data store, software, a configuration, a code flow, or a database that is running on the instance. For example, any time the instance 218 attaches a resource (e.g., network interface or storage volume), such mutations can be reflected in an instance data entry for the instance 218. In such situations, the instance data service 144 can determine the mutations being made to the instance 218, for example, based on requests received through the APIs 148 from the services that mutated the resources (e.g., a network interface or storage volume service). The instance data service 144 can automatically send, to the instance 218 or a local instance data service (e.g., the local instance data service 250), any updated instance data for the instance 218 upon updating the instance data or at periodic time intervals (e.g., every X minutes, where X is an integer greater than 1). Alternatively, the instance or local instance data service can send requests to the instance data service 144 for updated instance data. If the mutation was triggered from some action performed on the instance 218 (e.g., in response to a command executed by a user or a program running on the instance 218), then the instance 218 can send the updated instance data to the instance data service 144 and, optionally, store the updated instance data in the local instance data service 250. As a result, the instance data service 144 is able to manage up-to-date instance data for any given instance.

Additionally, updates to the instance data may arise, for example, from changes to existing instance data or injection of new instance data, for example, by an authorized user, instance, and/or resource. In some embodiments, authorized users, other instances, and/or other resources can utilize the APIs 148 to interact with the instance data service 144 for purposes of accessing, obtaining, and/or updating instance data for the instance 218. As mentioned, any updates to the instance data can be sent to the instance when the update is performed or at periodic time intervals.

Figure 3:
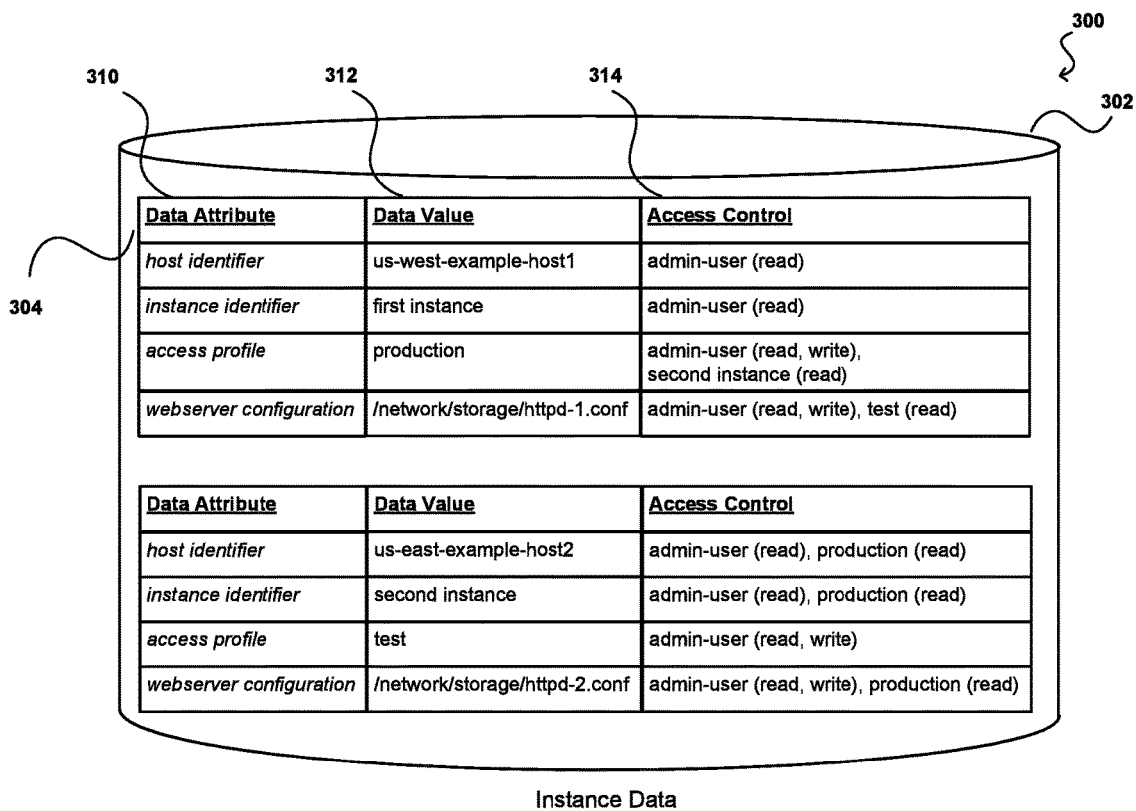
FIG. 3 illustrates example instance data that can be managed in accordance with various embodiments.

FIG. 3 illustrates example instance data 302 that can be managed by an instance data service implemented in accordance with various embodiments. In FIG. 3, the example instance data 302 is can be stored in a data store 300 (e.g., instance data store 146 and/or the instance data store 216). Depending on the implementation, the instance data 302 may be stored in a file, multiple files, separate data tables, databases, or other data storage mechanisms and media for storing data relating to a particular aspect.

As shown in the example of FIG. 3, the metadata 302 includes metadata for various instances. For each instance, the instance data can include an instance data attribute 310 and a corresponding value 312 for the instance data. In some embodiments, each instance data entry can be associated with access control information 314 to regulate which entities (e.g., users, instances, and/or resources) are able to access and/or update that instance data entry.

For example, the instance data 304 for a first instance indicates that the instance is hosted on host "us-west-example-host1" as determined by the instance data value associated with the attribute "host identifier." As shown, the instance data corresponding to the "host identifier" is associated with access control information that identifies a user "admin-user" that has access to read the instance data value (e.g., "us-west-example-host1") corresponding to the "host identifier" attribute. The instance data 304 also includes an instance data attribute "instance identifier" which indicates the name or identifier of the instance "first instance" and its access control information indicates that the user "admin-user" is able to read the corresponding instance data value (e.g., "first instance").

As mentioned, the instance data service implemented in accordance with various embodiments can be utilized to access and/or update certain instance data entries for instances. The instance data entries can be accessed and/or updated by the instance to which the instance data corresponds or by other users, instances, and/or resources that are permitted to do so, as determined at least in part on the corresponding access control information associated with the instance data entries.

In FIG. 3, the instance data 304 also includes an attribute "access profile" that identifies any access control tags associated with the instance. In this example, the instance "first instance" is associated with the "production" access control tag. In some embodiments, the access control tag can be utilized by an instance data service implemented in accordance with various embodiments to regulate which entities (e.g., users, instances, and/or resources) are able to access or update instance data information for other instances. As illustrated, the "access profile" instance data attribute is associated with access control information indicating that the user "admin-user" is able to read and update the instance data value for the attribute "access profile." In other words, the user "admin-user" is able to utilize any of the interfaces described above (e.g., APIs 148) to read the instance data value "production" for the attribute "access profile." Additionally, the user "admin-user" is able to update the instance data value, for example, by disassociating the instance "first instance" from the "production" access control tag, to associate the instance with a different access control tag, or to associate the instance with additional access control tags.

The instance data 304 also includes an instance data attribute "webserver configuration" which, in this example, can be used by the instance to determine which configuration file to use (e.g., "/network/storage/httpd-1.conf") when configuring its webserver. The access control information corresponding to this instance data value indicates that the user "admin-user" has read and write access meaning that the user "admin-user" is able to change the instance data value for this entry to identify a different configuration file, for example, through any of the interfaces described above. Further, in this example, the access control information also indicates that any entities associated with the "test" access control tag are able to read the instance data value "/network/storage/httpd-1.conf" and, as a result, are able to determine which configuration file is being utilized by the webserver running on the first instance. In various embodiments, the access control information associated with instance data entries can identify entities such as particular users, instances, groups (e.g., groups to which users and/or instances belong), and/or access control tags, as well any rights corresponding to each entity (e.g., read and/or write access) with respect to the instance data service.

The instance data entries illustrated in the example of FIG. 3 are provided only as examples. The instance data managed by the instance data service can include various instance data for any given instance, as described above, and may or may not include some or all of the instance data entries described in reference to FIG. 3. As mentioned, some examples of instance data can include hardware specifications of the instance, network information associated with the instance, and other information corresponding to the instance as described above. Instance data can also include instance data provided by entities for the instance that may be used to further customize the configuration or management of the instance. Such instance data may include, for example, custom parameters, scripts or programs, and/or various cryptographic keys (e.g., public/private keys) that the instance can access and utilize when running. Such information can be provided as strings of text or as files (e.g., JavaScript Object Notation (JSON) files).

Figure 4:
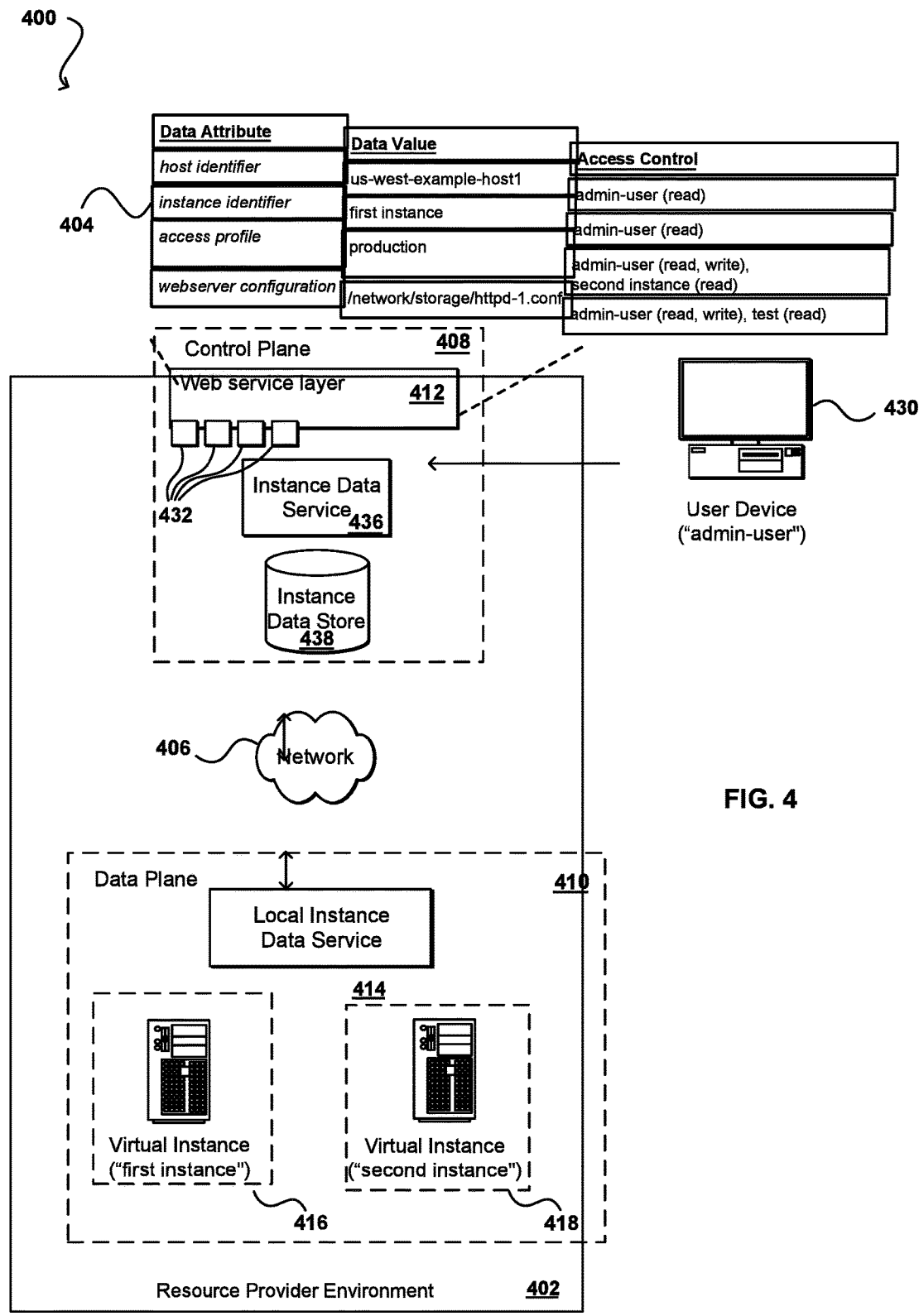
FIG. 4 illustrates a set of example components implemented in accordance with various embodiments.

FIG. 4 illustrates a set of example components 400 implemented in accordance with various embodiments. The example components 400 include a control plane 408, through which the instance data service 436 is provided, and a data plane 410, as described in reference to FIG. 1. As mentioned, the instance data service 436 can be configured to store instance data for some or all instances that are running in the data plane 410. The example components 400 also include a user device 430 being operated by a user "admin-user," and instances 416 and 418 running in the data plane 410. The user device 430 is able to interact with components in the resource provider 402, for example, the instance data service 436, through various APIs 432 provided by the web service layer 412. Each of the instances 416 and 418 can include some or all of the components included in instances 132, 138, as described in reference to FIG. 1. Further, components of the control plane 408 and the data plane 410 are able to communicate with one another through the network 406, e.g., an internal network of the resource provider 402. In this example, the instance data service 436 is able to utilize instance data store 438 through which instance data for instances can be managed. For purposes of explanation, in this example, the instance data store 438 includes the instance data 404 for the instance 416 ("first instance").

As mentioned, users, instances, and/or resources (e.g., components and/or control servers running in the control plane 408) can interact with the instance data service 436 to obtain and/or modify instance data for instances assuming such entities have the proper access rights, if any are defined. The user (e.g., "admin-user") operating the user device 430 can interact with the instance data service 436 to access or update instance data for instances 416 and/or 418. In this example, the user "admin-user" 430 is attempting to read the value for the "webserver configuration" instance data attribute for the first instance 416. To read the value, in some embodiments, the user "admin-user" 430 can interact with the instance data service 436 in the control plane 408 through one or more APIs 432. Each API 432 can be provided to receive requests for at least one specific action to be performed with respect to the instance data service 436. Upon receiving a request to one of the APIs 432, the request or call can be evaluated by the instance data service 436. In this example, the instance data service 436 can determine that the user "admin-user" is attempting to read the instance data value for "webserver configuration" for the instance 416. The instance data service 436 can determine whether the user "admin-user" is authorized to access the requested value by evaluating access control information associated with the value. In this example, the instance data value for the "webserver configuration" attribute is associated with access control information indicating that the user "admin-user" has access to read and update the instance data value "/network/storage/httpd-1.conf." Based on this determination, the instance data service 436 can obtain the requested instance data from the instance data store 438 and provide the requested data to the user device of the user "admin-user" 430. In some embodiments, access control of instance data reads and writes is not utilized, such that any entity is able to read and/or update instance data managed by the instance data service 436.

Additionally, if the user "admin-user" wanted to update the instance data value for the "webserver configuration" attribute, then the user "admin-user" could again utilize one of the APIs 432 to request that an update be made, for example, to change or replace the existing instance data value for the attribute, or to simply append additional information to the instance data value. Upon receiving the request to one of the APIs 432, the request or call can be evaluated by the instance data service 436 to determine that the user "admin-user" is attempting to update the instance data value for "webserver configuration" for the instance 416. The instance data service 436 can determine whether the user "admin-user" is authorized to update the requested value by evaluating access control information associated with the value. In this example, the instance data value for the "webserver configuration" attribute is associated with access control information indicating that the user "admin-user" has access to read and update the instance data value "/network/storage/httpd-1.conf." Based on this determination, the instance data service 436 can update the instance data stored in the instance data store 438 based on the request. Any changes to the instance data for the first instance 416 can be propagated or made accessible to the instance 416, as described above, such that the instance 416 is able to access up-to-date instance data 404 corresponding to the instance 416.

Similarly, the second instance 418 can also utilize the APIs 432 to access and/or update instance data values for itself as well as instance data values corresponding to the first instance 416. In this example, the second instance 418 is attempting to update the instance data value for the "access profile" attribute corresponding to the first instance 416. As mentioned, the second instance 418 can utilize one of the APIs 432 to send the update request to the instance data service 436. In an embodiment, the second instance 418 can send a request to the instance data service 436 that is resolved a local instance data service 414 running on the server that hosts the second instance 418. In this embodiment, the local instance data service 414 may include a cache of instance data. The local instance data service 414 can be configured to check the cache for the requested information and if it's not present, the local instance data service 414 can send a request for the data to the instance data service 436. In an example embodiment, the request sent by the local instance data service 414 can include proof that the instance 418 made the original request, such as a copy of the request the local instance data service 414 received from the instance 418.

Upon receiving the request, the request or call can be evaluated by the instance data service 436 to determine that the second instance 418 is attempting to update the instance data value for the "access profile" attribute corresponding to the first instance 416. The instance data service 436 can determine whether the second instance 418 is authorized to update the instance data value for the "access profile" attribute by evaluating access control information associated with the value. In this example, the instance data value for the "access profile" attribute is associated with access control information indicating that the second instance 418 has access to read, but not update, the corresponding instance data value "production." Based on this determination, the instance data service 436 can deny the update request and take no further action. In some implementations, the instance data service 436 can return an error indicating that the second instance 418 does not have sufficient access to perform the requested operation.

Figure 5:
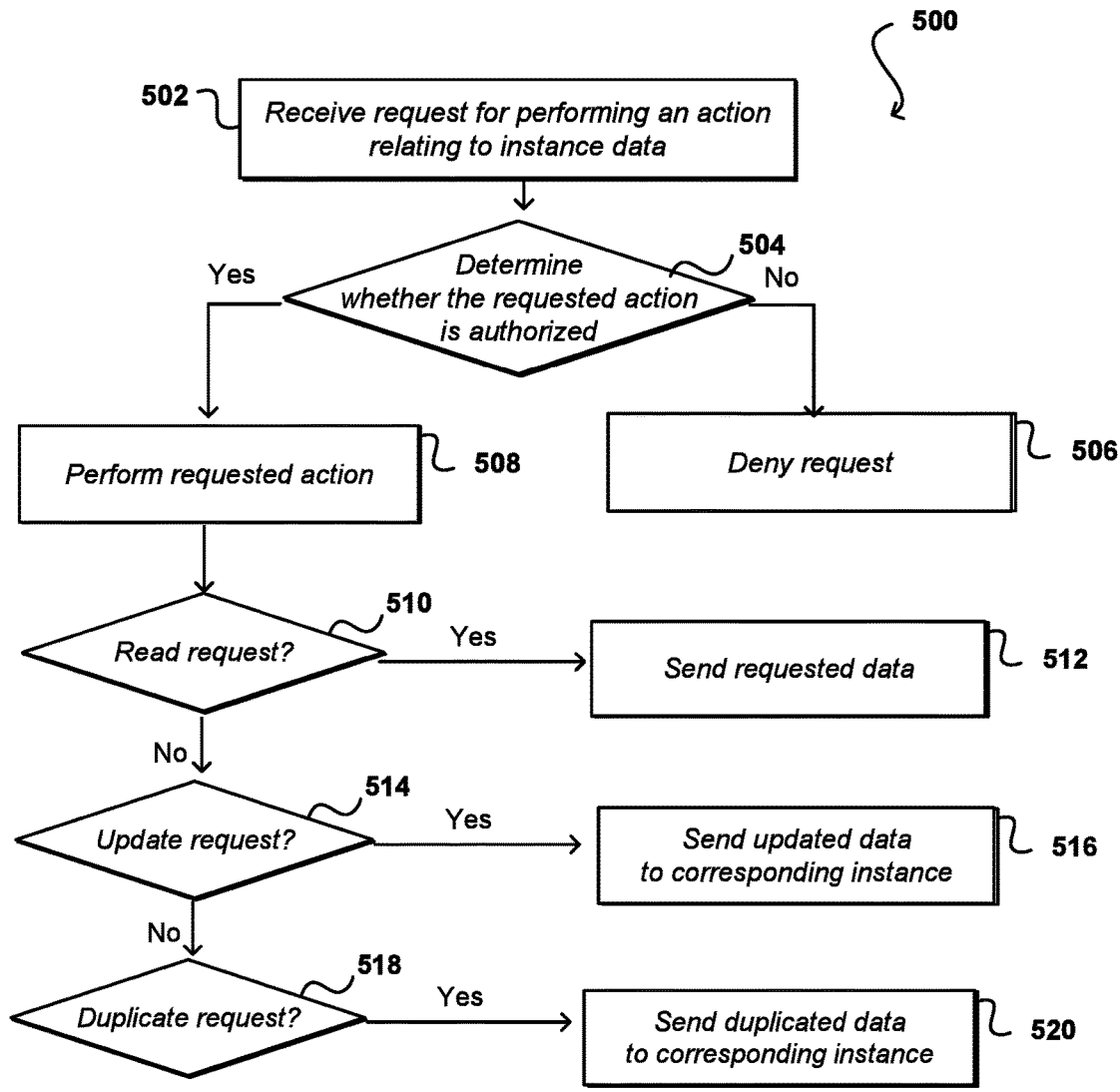
FIG. 5 illustrates an example process for processing requests by an instance data service in accordance with various embodiments.

FIG. 5 illustrates an example process 500 for processing requests by an instance data service in accordance with various embodiments. It should be understood that, for any process discussed herein, there can be additional, fewer, or alternative steps performed in similar or alternative orders, or in parallel, within the scope of the various embodiments unless otherwise stated. In this example, an instance data service 502 receives a request for performing an action that relates to instance data managed by the instance data service for virtual instances. As mentioned, such requests can be sent to the instance data service using one or more APIs that allow entities (e.g., users, instances, and other resources) to make calls into a provider environment to perform certain tasks relating to the stored instance data. For example, customers can access the instance data service from outside the resource provider environment by submitting web service requests to a public API or IP address, access a console, or use a command line interface to interact with the instance data service and instances can make requests to the instance data service to obtain meta data. The instance data service can determine, based on the request, the operations to be performed and on which instance data. For example, the request may specify a read operation for one or more instance data entries corresponding to a particular instance. Other operations are possible, including, for example, updating instance data for instances or duplicating instance data from a first instance to a second instance.

Typically, when sending the request for performing an action that relates to instance data managed by the instance data service, the instance or customer device sending the request needs some awareness of the names of the attribute-value pair(s) for which the action is directed. In some situations, the instance may be provided with information, for example, by the customer that provisioned the instance, that specifies various attribute-value pairs associated with a group of instances. Here, the instance can simply refer to such information to determine which attribute-value pairs are actionable for any instance in the group of instances. In other situations, the instance data service publishes a listing of instance data (e.g., attribute-value pairs) that is managed by the instance data service for various instances. Thus, the customer or any instances with credentials that grant access to metadata may be able to obtain the listing, for example, through an API, to determine which instance data attribute-value pairs are associated with any given instance of the customer managed by the instance data service. In some embodiments, instance data attributes are identified as being "public" or "private" such that, for any instance, instance data attribute-value pairs that have been tagged as being private are excluded from the listing of instance data while attribute-value pairs tagged as public are included in the listing.

The instance data service can determine whether to process the request 504 based at least in part on the request. For example, the instance data service can determine whether the entity submitting the request has the appropriate access rights for performing the requested operations by checking whether the requestor has a credential that authorizes the request change. If the entity does not have the appropriate access rights, then the instance data service will deny the request 506 and optionally send information describing why the request was denied. However, if the entity has the appropriate access rights, then the instance data service will perform 508 the requested action (e.g., an action such as a read, a write, a modify/delete, etc.). If the action corresponds to a request for reading some instance data, then the instance data service can provide 512 the requested instance data to the requesting entity. If the action corresponds to operation for updating 514 existing instance data for an instance, then the instance data service can update the data and make it available to the appropriate instances by providing 516 the updated instance data to the instance, for example, for storing in a local memory or cache of the instance. Naturally, an instance is able to interact with the instance data service utilizing the approaches described herein. For example, the instance may interact with the instance data service to update instance data associated with the instance itself. In some embodiments, entities can interact with the instance data service to duplicate some or all instance data associated with a first instance with a second instance. If the action corresponds to operation for duplicating 518 some or all existing instance data for a first instance to a second instance, then the instance data service can update the instance data being managed by the instance data service (e.g., in the instance data store 146), so that the appropriate instance data is identical for the first instance and the second instance. Further, the instance data service can send 520 the duplicated instance data to the second instance, for example, for storing in a local memory or cache of the second instance and use by the second instance.

Figure 6:
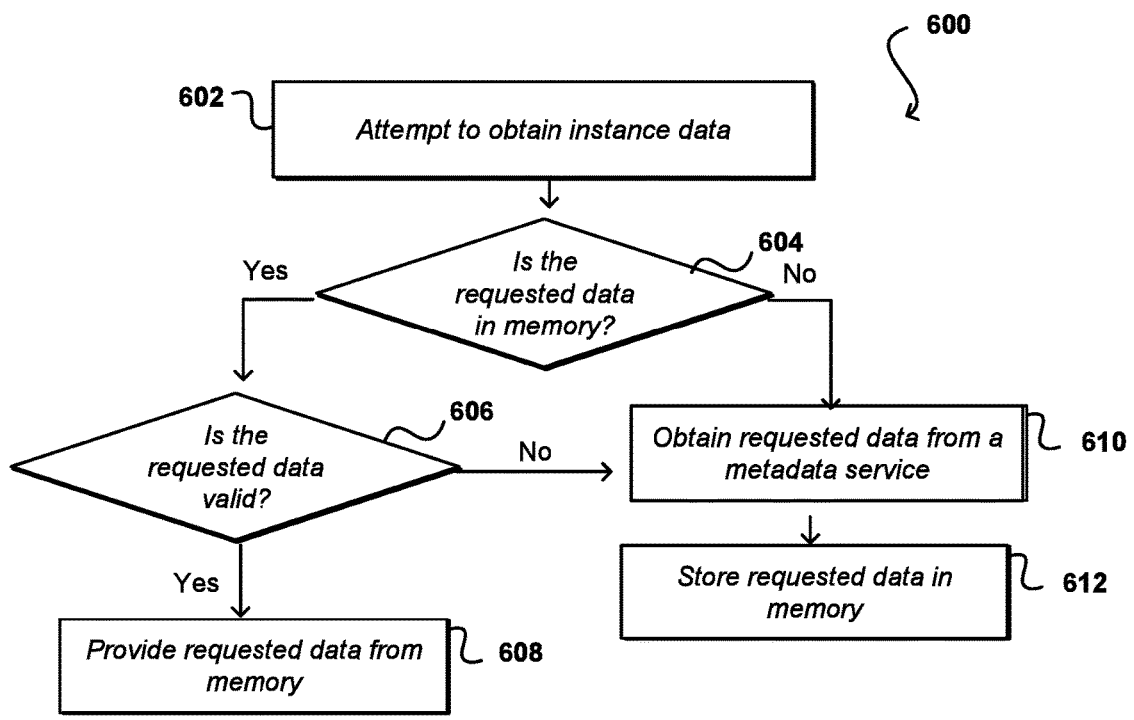
FIG. 6 illustrates an example process for processing instance data requests by an instance in accordance with various embodiments.

FIG. 6 illustrates an example process 600 for processing instance data requests by an instance in accordance with various embodiments. It should be understood that, for any process discussed herein, there can be additional, fewer, or alternative steps performed in similar or alternative orders, or in parallel, within the scope of the various embodiments unless otherwise stated.

In this example, an instance is attempting to access instance data 602, for example, in response to a request by a user of the instance or a program running on the instance. The instance can determine whether the requested instance data is available 604, for example, by determining whether the instance data is stored in a local memory or cache.

Since, in some embodiments, instance data may be associated with a value indicated when the data is stale or the last time it was updated, the instance can also determine whether the requested instance data is valid 606, e.g., the instance data satisfies any associated criteria. If the instance data is valid, then the instance can obtain the requested instance data from local memory or cache. If the instance determines 606 that the requested instance data is invalid, old, or if the instance determines 604 that the requested instance data is not in memory, then the instance can interact with the instance data service to obtain 610 the requested instance data. The instance can then store 612 the instance data obtained from the instance data service in local memory for future access.

Figure 7:
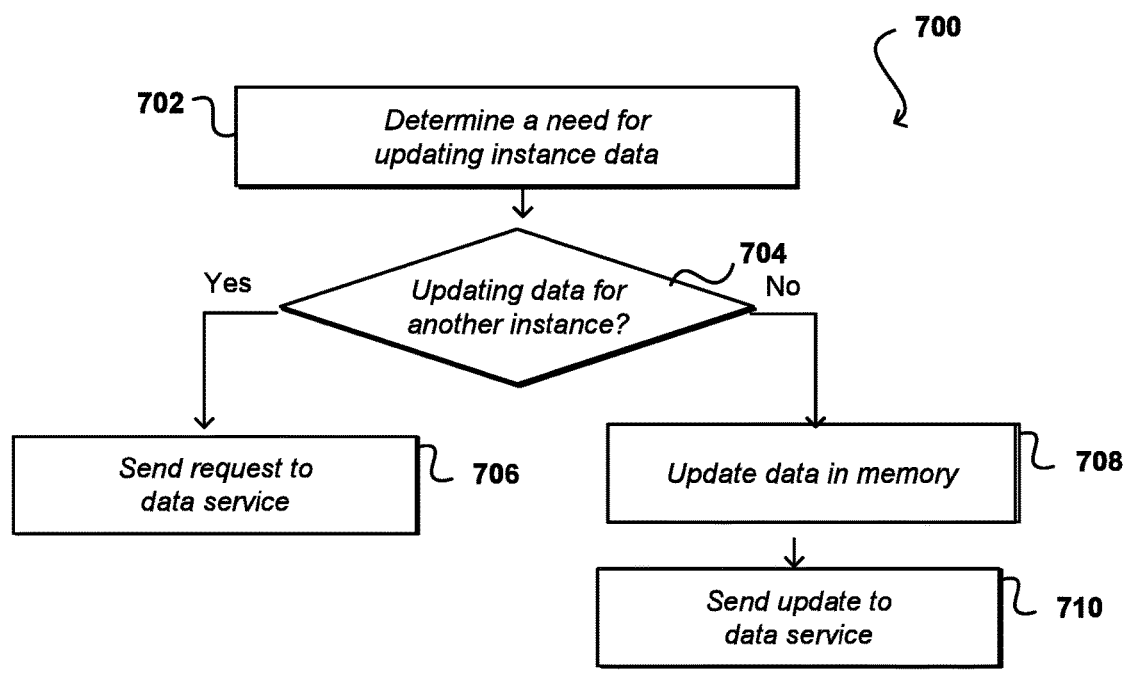
FIG. 7 illustrates an example process for updating instance data requests by an instance in accordance with various embodiments.

FIG. 7 illustrates an example process 700 for updating instance data requests by an instance in accordance with various embodiments. It should be understood that, for any process discussed herein, there can be additional, fewer, or alternative steps performed in similar or alternative orders, or in parallel, within the scope of the various embodiments unless otherwise stated.

In this example, an instance determines 702 a need for updating instance data. The request for updating instance data may arise from a user of the instance or by a program running on the instance, for example. The update request may be for updating instance data associated with the instance itself or for another instance, as described above. In this example, the instance determines 704 whether the instance data to be updated is associated with the instance or with another instance. If the instance determines that the instance data to be updated is associated with a different instance, then the instance can interact with an instance data service 706 to request the update. The instance data service can determine whether to process the request and, if the request is processed, the instance data service can update the instance data locally, for example, in an instance data store (e.g., the instance data store 146) and can provide the updated instance data to the different instance.

If the instance determines 704 that the instance data to be updated is associated with the instance itself, then the instance can update 708 the instance data accordingly in a local memory or cache. The instance can also send 710 a copy of the updated instance data to the instance data service for updating the instance data store (e.g., the instance data store 146). In some embodiments, to ensure synchronization between instance data stored by the instance and data stored by the instance data service, both of the operations for updating the instance data in local memory or cache (i.e., step 708) and sending a copy of the updated instance data to the instance data service (i.e., step 710) must complete successfully. That is, if either the operation of updating the instance data in local memory or cache or the operation of sending a copy of the updated instance data to the instance data service fails, then the other operation is rolled back.

In some embodiments, the instance data service is configured to periodically (e.g., at predetermined time intervals) synchronize instance data stored by the instance data service and instance data stored by the instance in local memory or cache. For example, the instance data service can interact with the instance through a synchronization API through which the instance data service provides the instance with a copy of the instance data stored by the instance data service. In an alternative embodiment, the instance can periodically poll the instance data service by sending a request for updated information to the web service interface of the instance data service. The instance can evaluate this instance data with respect to the instance data stored by the instance in local memory or cache. If any discrepancy between the two sets of instance data is determined, then the instance can treat the instance data provided by the instance data service as the "master" copy and, accordingly, update its instance data stored in local memory or cache to match the instance data to match the instance data provided by the instance data service. Naturally, different variations for synchronization are possible, depending on the implementation. For example, the instance data stored by the instance in local memory or cache may be treated as the "master" copy from which the instance data service is updated, as described above.

Figure 8:
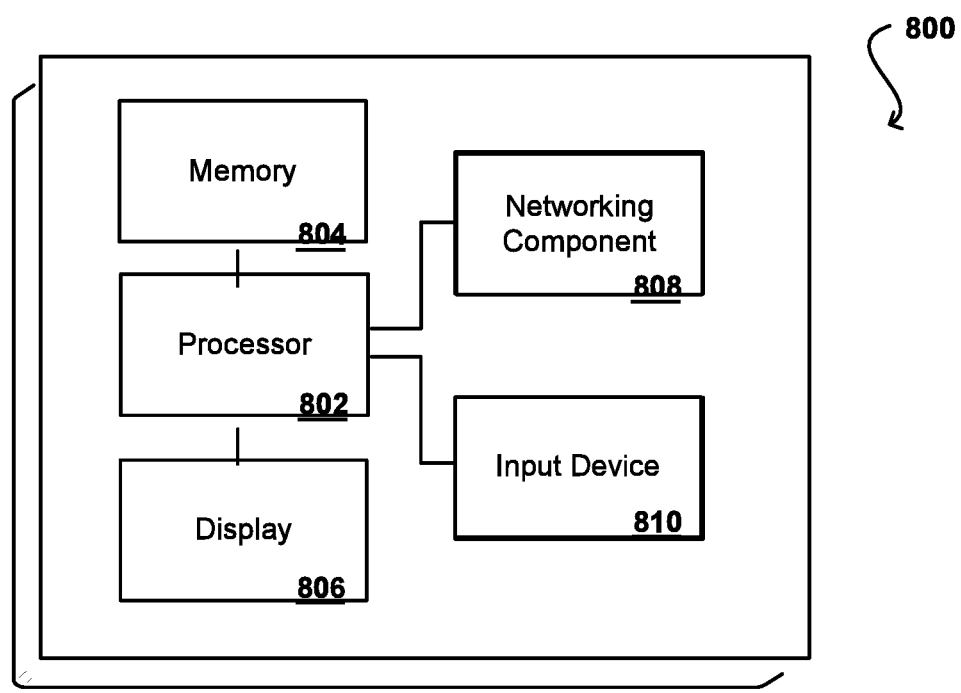
FIG. 8 illustrates a set of components of an example computing device that can be used to perform aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 9:
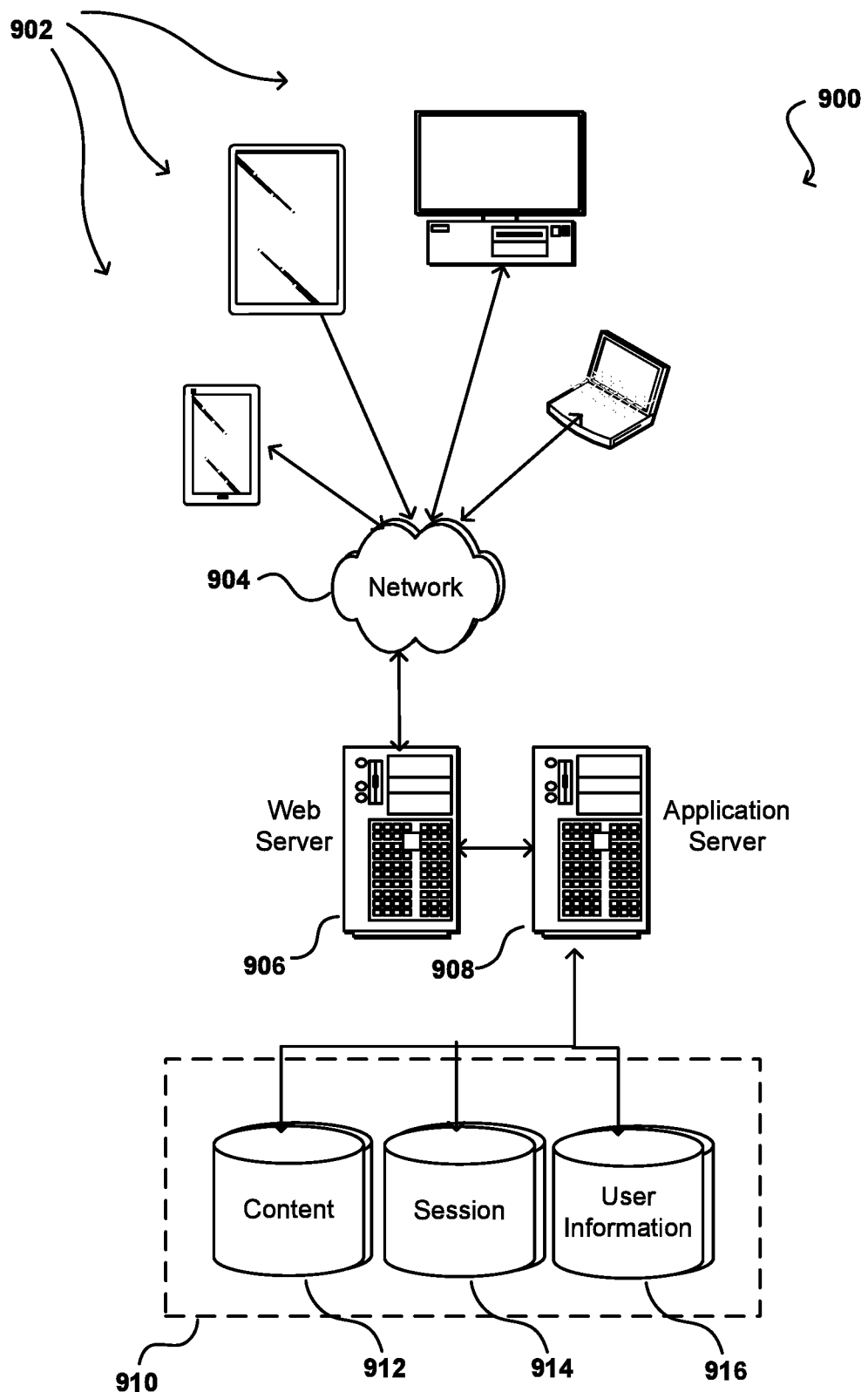
FIG. 9 illustrates an example environment in which aspects of various embodiments can be performed.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
deploying instance data to a first virtual instance that is active in a resource provider environment, wherein the instance data includes at least configuration information about the first virtual instance;
receiving, from a customer to an application programming interface of the resource provider environment, a request to update the instance data;
generating updated instance data based on the request;
causing the updated instance data to be made available to the first virtual instance through an instance data service;
receiving, from an entity, at least one request for duplicating, for a second virtual instance, the updated instance data;

determining, using at least one processor, that the entity is authorized to duplicate the updated instance data;
updating, based on the updated instance data, at least a portion of instance data associated with the second virtual instance;
storing, in a memory, modified instance data for the second virtual instance, the modified instance data based at least in part on the updating of the at least a portion of instance data associated with the second virtual instance; and
providing the modified instance data to the second virtual instance, wherein the second virtual instance stores the modified instance data in a data store managed by the second virtual instance.

2. The computer-implemented method of claim 1, further comprising:
providing the portion of the instance data to the entity.

3. The computer-implemented method of claim 1, further comprising:
updating the portion of the instance data based at least in part on a request to create updated instance data; and
storing the updated instance data.

4. The computer-implemented method of claim 1, wherein determining that the entity is authorized to duplicate the updated instance data further comprises:
determining, by the resource provider, that the entity is authorized to access the updated instance data based at least in part on the instance data.

5. The computer-implemented method of claim 1, wherein the instance data includes at least one of an attribute of the first virtual instance, a configuration of the first virtual instance, text, a parameter, argument, variable, or cryptographic material.

6. A system, comprising:
at least one processor;
memory including instructions that, when executed by the at least one processor, cause the system to:
deploy instance data to a first virtual instance that is active in a resource provider environment, wherein the instance data includes at least configuration information about the first virtual instance;
receive, from a customer to an application programming interface of the resource provider environment, a request to update the instance data;
generate updated instance data based on the request;
cause the updated instance data to be made available to the first virtual instance through an instance data service;
receive, from an entity, at least one request for duplicating, for a second virtual instance, the updated instance data;
determine, using at least one processor, that the entity is authorized to duplicate the updated instance data;
update, based on the updated instance data, at least a portion of instance data associated with the second virtual instance;
store, in a memory, modified instance data for the second virtual instance, the modified instance data based at least in part on the updating of the at least a portion of instance data associated with the second virtual instance; and
provide the modified instance data to the second virtual instance, wherein the second virtual instance stores the modified instance data in a data store managed by the second virtual instance.

7. The system of claim 6, wherein the instructions further cause the system to:
provide the portion of the instance data to the entity.

8. The system of claim 6, wherein the instructions further cause the system to:
update the portion of the instance data based at least in part on a request to create updated instance data; and
store the updated instance data.

9. The system of claim 6, wherein the instructions to determine that the entity is authorized to duplicate the updated instance data further cause the system to:
determine, by the resource provider, that the entity is authorized to access the updated instance data based at least in part on the instance data.

10. The system of claim 6, wherein the instance data includes at least one of an attribute of the first virtual instance, a configuration of the first virtual instance, text, a parameter, argument, variable, or cryptographic material.

11. A computer-implemented method, comprising:
receiving, by an application programming interface of a first compute instance, a request for accessing first instance data associated with the first compute instance, the first compute instance being active in a resource provider environment, and the first instance data including at least configuration information about the first compute instance;
determining that the first instance data is unavailable in a data store managed by the first compute instance;
sending, to the resource provider, a request for the first instance data, wherein the resource provider is configured to manage respective instance data for a plurality of compute instances active in the resource provider environment;
receiving, from the resource provider, the first instance data in response to the request;
storing the first instance data in the data store managed by the first compute instance;
receiving, by the first compute instance, a request for modifying second instance data associated with a second compute instance;
sending, to the resource provider, a request to update the second instance data, wherein the resource provider is configured to determine that the first compute instance is authorized to modify the second instance data;
receiving, by the first compute instance from the second compute instance, a request to access the modified value of the first data attribute;
determining that the second compute instance is authorized to access the modified value of the first data attribute; and
providing information describing the modified value to the second compute instance, wherein the resource provider is configured to update and store the second instance data based at least in part on the request, and wherein the resource provider is configured to send the updated second instance data to the second compute instance.

12. The computer-implemented method of claim 11, wherein the first instance data and the second instance data are associated with access control information including access rights for performing an operation on the first instance data or the second instance data.

* * * * *